United States Patent [19]
van Rooij et al.

[11] Patent Number: 5,728,021
[45] Date of Patent: Mar. 17, 1998

[54] TRANSMISSION CHAIN FOR A CONE PULLEY TRANSMISSION

[75] Inventors: Jacobus H. M. van Rooij, Nuenen; Theodorus P. M. Cadée, Asten, both of Netherlands

[73] Assignee: Gear Chain Industrial B.V., An Nuenen, Netherlands

[21] Appl. No.: 642,577

[22] Filed: May 3, 1996

[30]     Foreign Application Priority Data

May 3, 1995 [NL] Netherlands .................... 1000294

[51] Int. Cl.$^6$ ............................................ F16G 13/02
[52] U.S. Cl. ........................ 474/229; 474/230; 474/242
[58] Field of Search ................................ 474/167, 226, 474/228–230, 242

[56]         References Cited

U.S. PATENT DOCUMENTS

| | | | |
|---|---|---|---|
| 3,916,709 | 11/1975 | Steuer et al. | 474/242 |
| 4,618,338 | 10/1986 | Rattunde et al. | 474/242 X |
| 5,026,332 | 6/1991 | Mott et al. | 474/242 |

FOREIGN PATENT DOCUMENTS

| | | |
|---|---|---|
| 0362963 | 4/1990 | European Pat. Off. . |
| 3740504 | 6/1989 | Germany . |
| 9407472 | 10/1994 | Germany . |
| 2080477 | 2/1982 | United Kingdom . |
| 2178130 | 2/1987 | United Kingdom . |
| 2185300 | 7/1987 | United Kingdom . |

*Primary Examiner*—Roger J. Schoeppel
*Attorney, Agent, or Firm*—Edmund M. Jaskiewicz

[57]          ABSTRACT

Transmission chain for a cone pulley transmission with links, coupled by pins, engaging the cone pulley surfaces, and by elongate each link accommodating, non-rotatable with respect to it, a pin and, in the longitudinal dimension of the link at a distance therefrom an interpiece; each pin cooperating with an opposite interpiece and with; in each link, adjacent each active side surface of a pin and an interpiece respectively sufficient free space to accommodate an interpiece or pin respectively, which is coupled to an adjacent link, during its movement, and with adjacent sets of links mutually coupled in the longitudinal direction of the transmission chain in that one pin in a first link co-operates with a rolling contact movement with an interpiece in an adjacent, staggered link.

6 Claims, 5 Drawing Sheets

TRANSMISSION CHAIN FOR A CONE PULLEY TRANSMISSION

BACKGROUND OF THE INVENTION

The invention relates to a transmission chain for a cone pulley transmission with a number of links, mutually coupled by elongate pins, which extend through the links and of which the respective axial end faces engage the cone pulley surfaces, and by elongate strip-shaped interpieces, also extending through the links, which pins and interpieces engage each other along cooperating side surfaces thereof in a rolling motion with respect to each other.

DESCRIPTION OF THE PRIOR ART

Such a transmission chain is known from the European Patent 0 362 963 in which the present inventor is mentioned as co-inventor. In this known transmission chain each link accommodates two pins of which the end surfaces co-operate with the two opposite pulley surfaces; each pin co-operates with its longitudinal side surfaces with two strip-shaped interpieces.

Although this known transmission chain constitutes a significant improvement over prior transmission chains it still has some drawbacks. The inevitable "chordal effect" makes this chain still somewhat noisy during operation; the energetic efficiency is open for improvement and the many parts of which this chain is made makes assembly somewhat complicated, increase the weight of the chain and therewith the centrifugal forces acting on it and, of course, also the cost of this chain.

SUMMARY OF THE INVENTION

The invention aims to improve this known transmission chain by improving the efficiency thereof, reducing the level of noise generated during use and by reducing the number of parts thereof.

To this end according to the invention each link accommodates, non-rotatable with respect to it, a pin and, in the longitudinal dimension of the link at a distance therefrom an interpiece while of each pin the active side surface is directed to the, active side surface of an opposite interpiece and there is in each link, adjacent each active side surface of a pin and an interpiece respectively sufficient free space to accommodate an interpiece or pin respectively which is coupled to an adjacent link during the movement thereof, while adjacent sets of links are coupled mutually in the longitudinal direction of the transmission chain in that one pin in a first link co-operates with a rolling contact movement with an interpiece in an adjacent, staggered link.

Contrary to the prior art in the novel transmission chain the pins do not execute a rotating movement with respect to the surface of the cone pulleys when they come into contact with these surfaces. As a result thereof there are less friction losses, so the efficiency is improved and the torque which can be transmitted by a chain with given dimensions is increased. In the transmission chain according to the invention the inter-action between the co-operating side surfaces of pins and interpieces result in a correct positioning of the pins with respect to the cone pulleys when they enter between them so that there will be no rotation of the pins with respect to the pulleys and no friction losses. The distance between two pins in a link is reduced, thus reducing the pitch of the chain which in turn reduces the chordal action. The pins enter between the pulleys at such a position that the "chordal action" is nearly absent. Practical tests under actual running conditions have shown that the chain generates very little noise and the resulting over-all sound level and spectrum is being experienced as being of a non-annoying nature. There are significally less parts; the chain is thus cheaper, with much less parts to assemble and it can be constructed considerable lighter, reducing centrifugal forces.

Preferably at least the upper and lower boundary of the free space adjacent each pin and interpiece respectively corresponds with the envelope of the path as described by the co-operating interpiece and pin respectively.

In a preferred embodiment the active side surfaces of a pin is curved, and same of an interpiece is flat.

Advantageously the cross-section of the active side surface of a pin is essentially an involute with the base circle near the inner edge of said side surface.

It is preferred that the pins and interpieces are with a press fit coupled to the respective links.

To prevent excessive side play the pins and interpieces are preferably provided at their respective ends with a projection for locking them in longitudinal direction.

DESCRIPTION OF PREFERRED EMBODIMENTS

Figure 1:
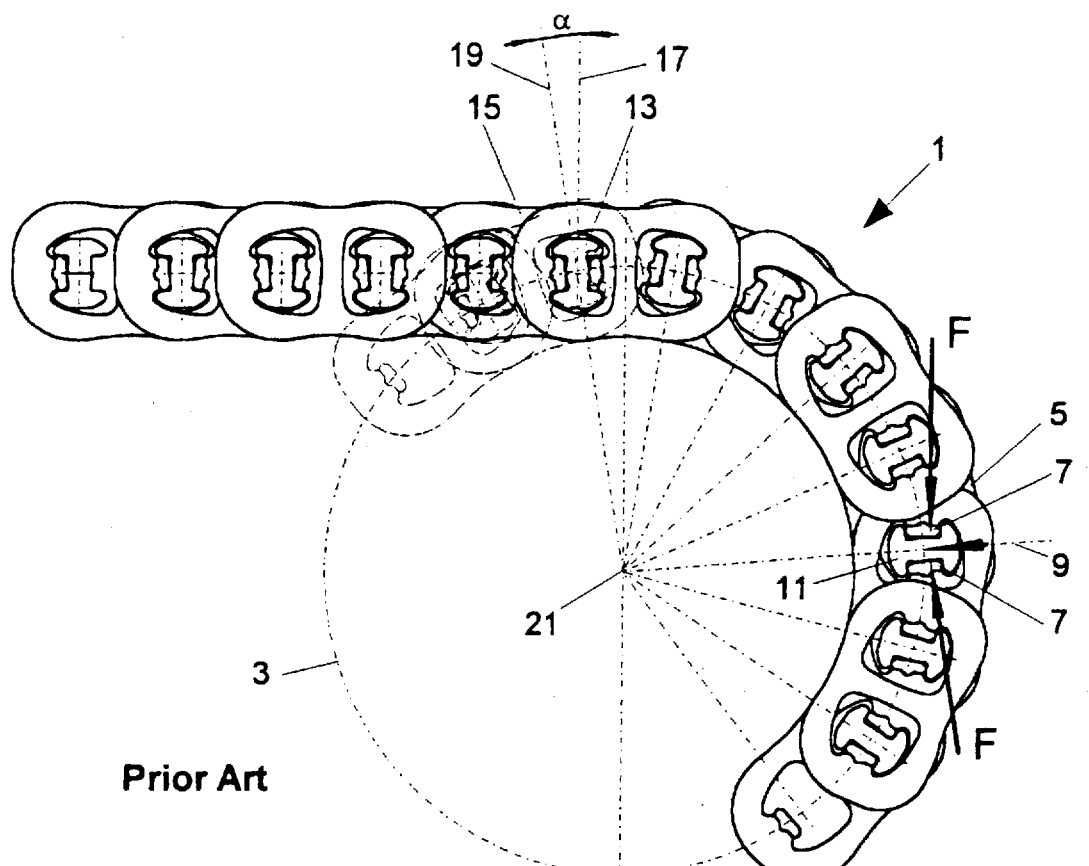
FIG. 1 shows a view of the transmission chain according to the prior art during co-operation with a cone pulley.
Figure 2:
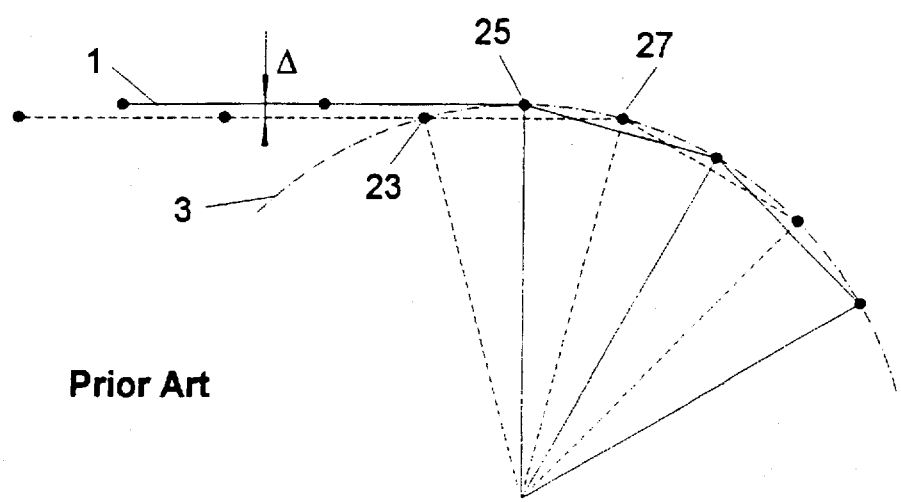
FIG. 2 elucidates schematically the chordal action which takes place when this known chain enters between the pulleys.

On the hand of FIGS. 1 and 2 the disadvantages of the transmission chain according to the prior art will be elucidated. These are the result of the specific structure of this known transmission chain and of the chordal action which takes place therein.

This prior art is documented by the European Patent Application 0 362 963, the contents of which is considered to be included herein by reference.

FIG. 1 shows a view of a part of the known transmission chain, denoted with numeral 1, when co-operating with a cone pulley transmission. For purposes of clarity only the circle of rotation 3 on one of the two cone pulleys, on which the transmission chain runs, is shown.

The links 5 exert through the interpieces 7 symmetrical forces F on the pin 11 with respect to the centre line 9 of this pin 11. As a result thereof the pin 11 is forced with its center line 9 directed in the radial direction towards the center 21. The pin 13, which lies in the transition between the straight and the curved part of the transmission chain 1, however, cannot direct itself radially—such a position would only be possible if the link 15 were in the position shown by the dotted line. The result is that the center line 17 of the pin 13 includes an error angle α with respect to the line 19 which goes through the center 21 of the cone pulley and the center of the pin. When entering, the pin 13 gradually rotates with respect to the surfaces of the cone pulleys until after one pitch—the distance between two consecutive pins—after the first contact it assumes the radial position mentioned above. During rotation the tangential transmission of power in tangential direction between the head of a pin and the cone pulley surface is, of course, smaller than it would be when there were no relative rotating movement between pin and cone pulley, such as is the case in the part between the entry and the exit of the pin between the pulleys. This also means that the maximum power which can be transmitted is smaller when the pin is entering and when the pin is leaving, than when the pin is stationary with respect to the pulleys. It is particularly the relative movement between pin and cone pulleys when entering which is unfavorable and undesirable and causes losses.

In addition to the energy loss due to the movement under friction between the end faces of the pin and the cone pulleys, which is inherent to the structure of the known transmission chain, there is also an effect known as "chordal action". This is explained in FIG. 2. In this figure the circle of rotation 3, representing the line along which the transmission chain is in contact with the cone pulleys is represented by a dash-dot line; the pins of the transmission chain are indicated schematically by bold dots. The connecting lines in between represent the links.

The position of the transmission chain on the moment in which a pin starts to come into contact with the cone pulleys is represented by the dotted lines while the solid lines represent the transmission chain in the highest position of the links. (Note that the dashline and the solid line are drawn parallel which is a hypothetical case, purely for clarity reasons and not in correspondence with the practical situation.) Let us assume that the first contact between the pin 13 and the cone pulleys takes place at point 23. When it moves on the pin is then lifted and passes through the highest point 25. It hereby lifts up the straight part of the transmission chain to the left of it and then proceeds to point 27. When the pin arrives at point 27, the straight part of the transmission chain is down again until the next pin comes into contact with the cone pulleys at point 23. Then the straight part of the transmission chain once again moves up and down over the distance Δ. The result is that the straight part vibrates constantly, generating noise—a disadvantage common to all prior art transmission chains. Furthermore at point 23 the movement of the pin changes direction (from a movement in a straight line suddenly to an arc-shaped movement). This causes an entrance impact which also generates noise. Finally, as a result of this pattern of movement the speed of the transmission chain in the longitudinal direction thereof is not uniform, resulting in longitudinal vibrations with, of course, also the generation of noise. All these effects together lead to the unwanted and annoying generation of noise when operating the prior art cone pulley transmissions. By reducing the pitch (which is possible in the chain according to the invention), the sum of all these effects will be smaller, reducing the generation of noise. Furthermore in the novel transmission chain the generation of noise will be reduced by eliminating, or at least greatly reducing, the chordal action because the first contact between pins and cone pulleys can take place at or at least near the highest point 25. Removing the source of these evil effects has, of course, much more effect than merely trying to limit the amplitude and frequency of the vibrations which arise with the prior art chains.

Figure 3:
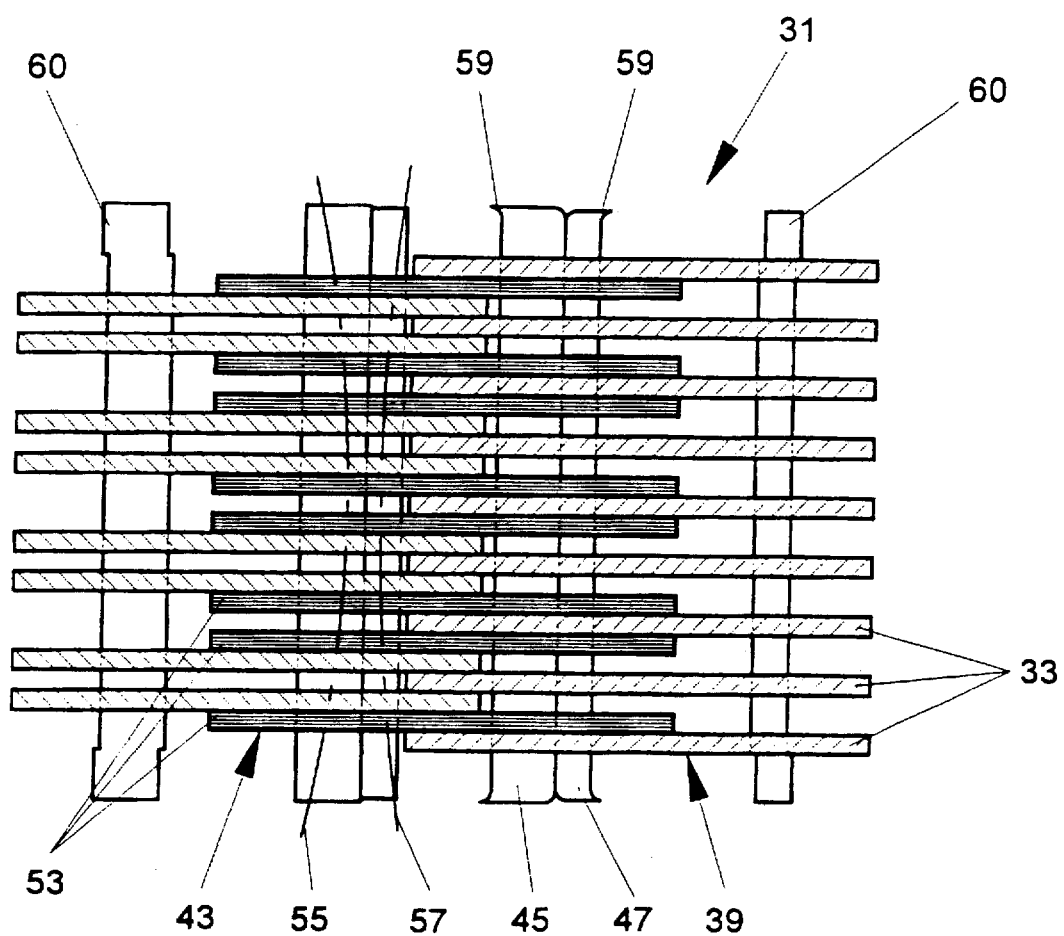
FIG. 3 shows a top view of a part of a transmission chain according to the invention.
Figure 4:
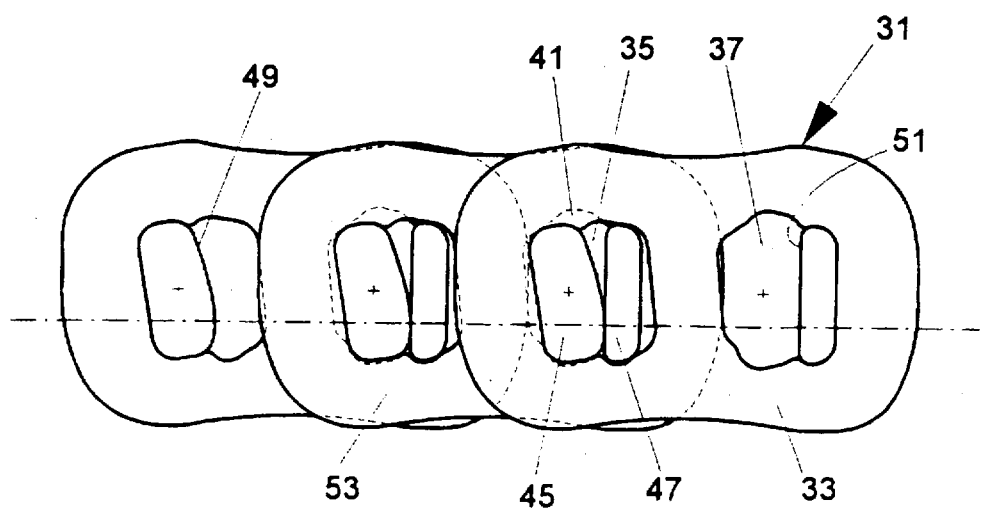
FIG. 4 shows a side view of this transmission chain.

FIG. 3 shows a top view of three sets of links of an embodiment of a transmission chain 31 according to the invention, and FIG. 4 shows a side view thereof. The links of the three sets are marked by different patterns. In each link 33 there is a first and a second hole 35, 37, although, of course, these holes can be combined into a single one. The first holes 35 of a first set 39 are situated in line with the second holes 41 of a second set 43. The sets of links are inconnected to each other in the longitudinal direction of the chain by pins 45 and interpieces 47. Through each hole passes a pin 45 and an interpiece 47. Each pin 45 and interpiece 47 has a contact surface 49, 51 respectively over which they execute a rolling movement with respect to each other. Each pin 45 is connected to (being partly enclosed by) the respective link 33 where the pin passes through the first hole 35 and each interpiece 47 is connected to (being partly enclosed by) the respective link 53 where the strip passes through the second hole 41. The pins and interpieces are preferably connected to the links by a press fit.

Another possible or additional measure for securing the links to the pins and interpieces is to let the pins and strips be slightly curved prior to assembly, as indicated greatly exaggerated in FIG. 3 by the curved center lines 55, 57. After assembly the pins and strips are bent back elastically into the straight position where they are partly enclosed in the link holes. Thus the pins and strips exert an extra normal force on in particular the outermost links and are secured against displacement. Also there may be small projections on the ends of the strips, which secure the outermost links against displacement outwards. The projections may consist of burrs 59 or slight protrusions 60 which are formed during the manufacturing process.

Figure 5:
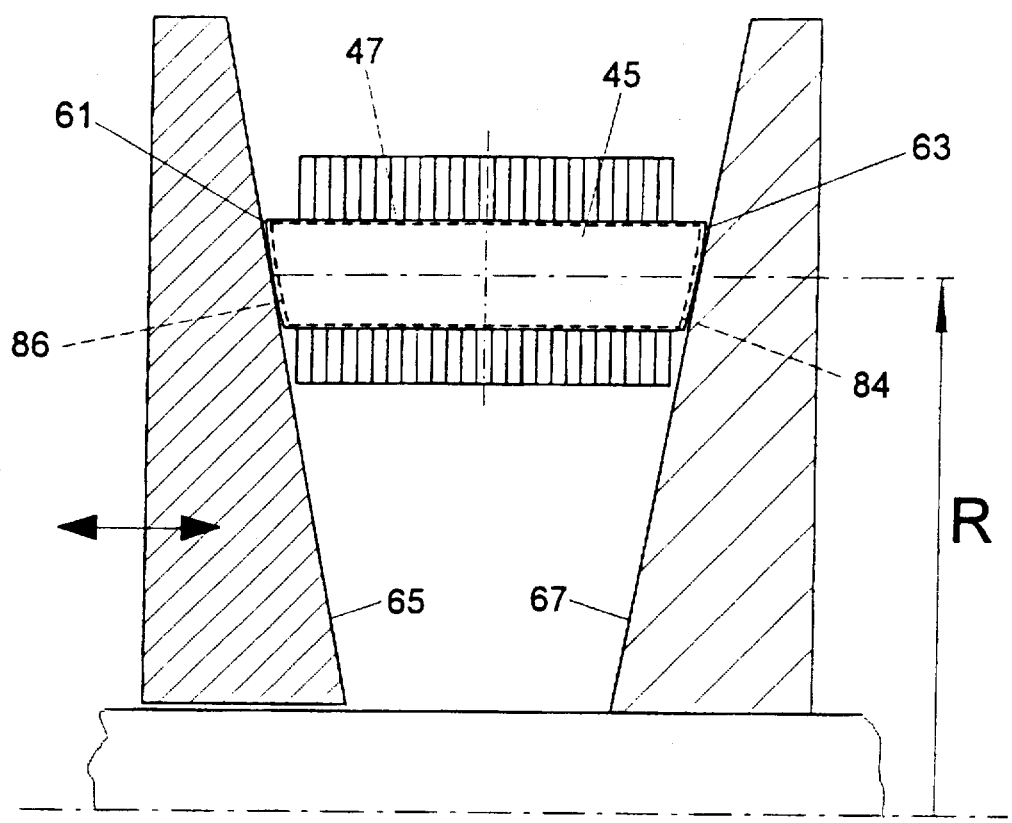
FIG. 5 shows a cross-section of this transmission chain with the cone pulleys.

The strips 47 of the transmission chain 31 are shorter than the pins 45 so that only the pins are clamped between the cone pulley, as shown in FIG. 5. The pins 45 are with their end faces 61 and 63 in contact with the surfaces 65 and 67 of the cone pulley; these end faces preferably have a convex shape and constitute in the known way friction surfaces which co-operate with the cone pulleys surfaces to transmit the pulling force in the transmission chain to the cone pulleys.

Figure 6:
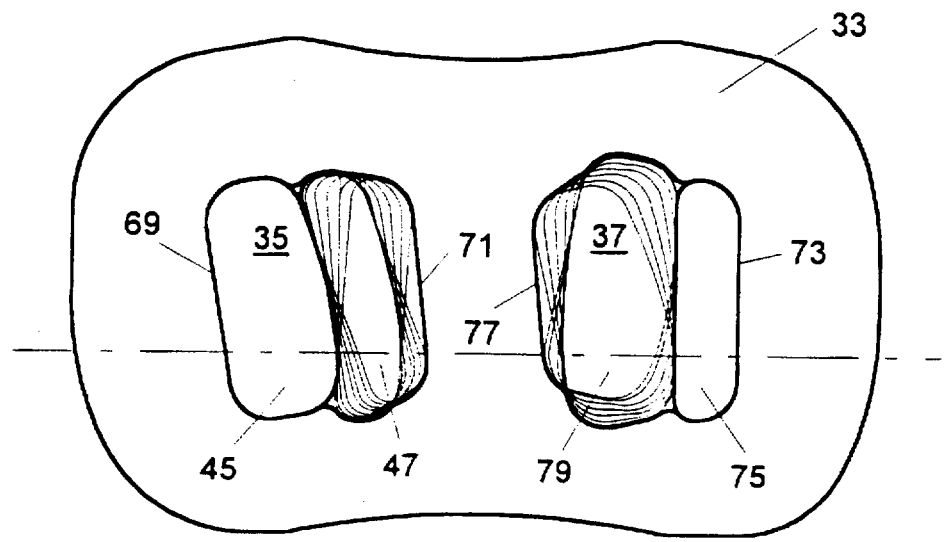
FIG. 6 shows the various positions between a pin and an interpiece when rolling off over each other.

The shape of the holes in the links is shown in FIG. 6. A part 69 of the contour of the first hole 35 closely resembles, or is just a little smaller than, the contour of the pin 45. The remaining part 71 of the contour of the first hole 35 must be such that an interpiece 73, which co-operates with a pin 45, can move freely with respect to this pin, which means that it must be at least almost identical to the envelope of the path of the interpiece 47—by which is meant the envelope of the various positions of the strip—when the strip 47 rolls off over the pin 45. The form of the second hole 37 is defined in an analogous way. Here, a part 73 of the contour fits closely or, if desired for a press fit, is a little smaller than the contour of the interpiece 75 and the remaining part 77 of the contour is shown as being almost identical to the envelope of the path of the pin 79 (that is, the various positions of the pin) when the pin 79 rolls off over the strip 75. Of course, this part 77 can also be greater than this envelope—essential is a free movement of a pin with respect to this interpiece.

Figure 7:
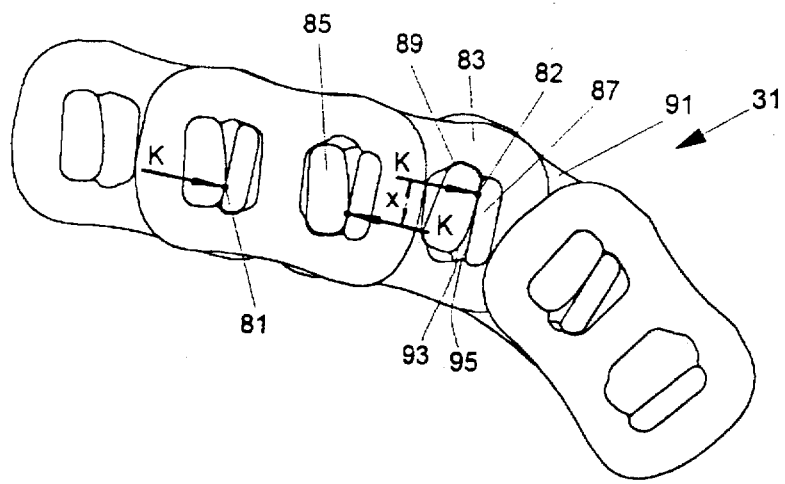
FIG. 7 shows the position of a pin and a interpiece when entering between a cone pulley.

FIG. 7 shows the position of a part of the transmission chain 31 when entering between the pulley faces. It is clearly shown that the line of contact between the pin and the interpiece indicated with 81, at the left and with 82 at the right during the entry changes in position. Because the pulling force K in the transmission chain is transmitted at the position of this line of contact from the one link to the other, a moment K.x is exerted on the incoming link 83. When entering, the pin 85, coupled to this link 83 has not yet contacted the cone pulleys, as a result of which the link 83 can freely rotate about the line of contact 82 of the strip 87 coupled to the link 83 and the pin 89 of an upstreams link 91, which in the meantime has, in fact, contacted the cone pulley. The moment K.x acting on the link 83, which is entering, will rotate the link a little as a result of which the pin 85 will be tilted upwardly, that is to say is thus at a greater distance from the plane (P in FIG. 8) through the two axes of the cone pulley transmission. The interpiece is a little shorter than the pin (see FIG. 5), so that the end faces 84 and 86 of the interpiece do not come into contact with the pulley, and the link can rotate freely.

Figure 8:
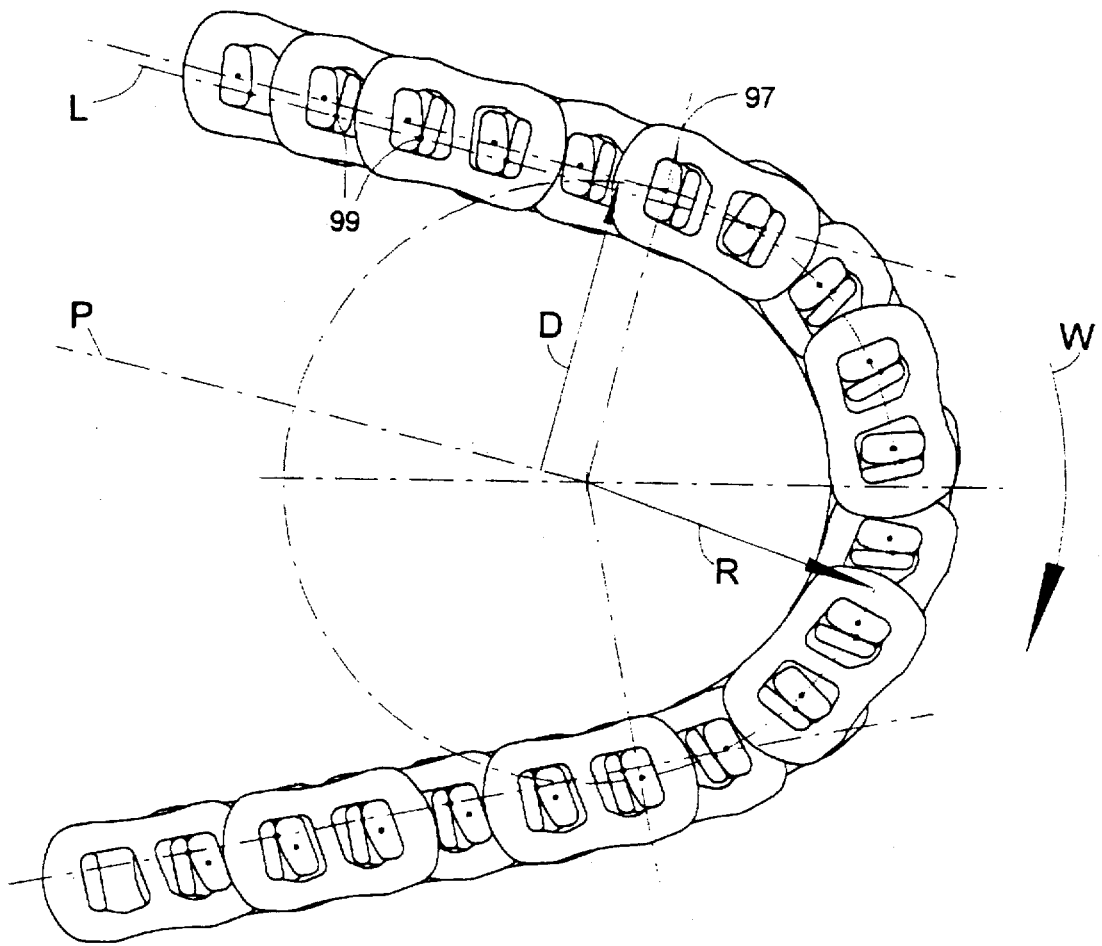
FIG. 8 shows the position of a number of links, pins and interpieces when they enter between a cone pulley.

The distance over which the pin 85 is lifted upwardly depends on the shape of the contact surfaces 93 of the pin 89 and 95 of the strip 87. When the pin is lifted upwardly sufficiently, the chordal action, as described before, will disappear. This is shown in FIG. 8. Here it can be seen that the point of contact 97 between pin and cone pulley at the moment of the first contact between pin and cone pulley takes place at that height at which the distance D between an imaginary plane P through the axis of the cone pulley and practically parallel to the incoming straight part of the transmission chain on the one hand, and the point of contact 97 on the other hand is at least almost equal to the running radius R (see also FIG. 5) of the transmission chain over the cone pulleys. The pins will therefore contact the pulley at or nearly at the highest point (this is the point where the distance D is equal to running radius R), as a result of which there will be no, or very little, chordal action. The lines of contact 99 between the pins and interpieces will always lie on one line L.

Figure 9:
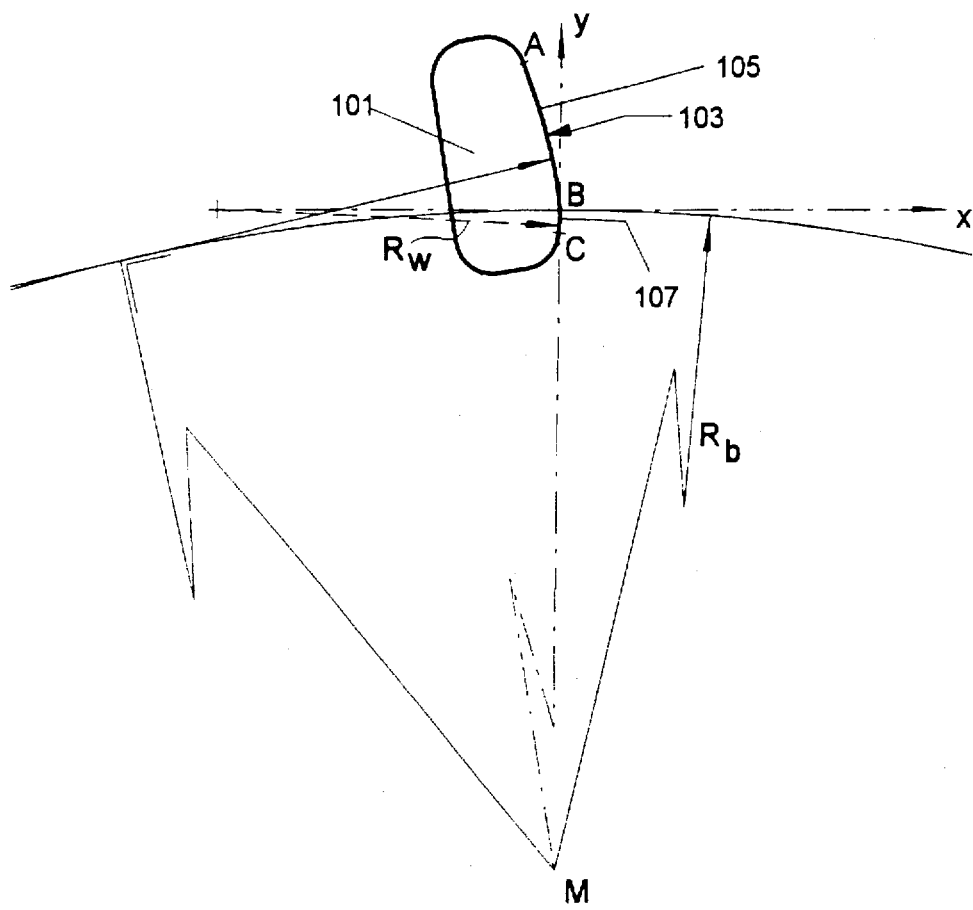
FIG. 9 shows the cross-section of a pin of the transmission chain according to the invention.

The above-described situation in which the chordal action disappears completely or almost completely, is also favored when the cross-section of the contact surface 95 of the strip 87 is a straight line and same of the contact surface 93 of the pin 89 is at least almost an involute. This is shown an an enlarged scale in FIG. 9. FIG. 9 shows the position of a pin 101 as it is in the straight part of the transmission chain between the two pulleys. The pin is in contact with a strip (which is not shown) at the position of the line of contact B. The pin has a contact surface 103 with which the pin co-operates with an interpiece. The part 105 of the contact surface 103 has in cross-section an involute form with a base circle with radius $R_b$ and a centre M. The part 105 extends from line B to line A. The part 107 of the contact surface 103, which extends from line B to line C, has in cross-section almost the form of a circle cylinder with radius $R_w$. Only the part 105 of the contact surface 103 co-operates with the strip during the contact between the pin and the cone pulleys during entry. This part 105 of the contact surface also causes the link to lift and rotate as a result of which the chordal action is reduced.

Of course the invention is in no way limited to the shown and described embodiment. The strip can also be made with a curved contact surface and the pin with one deviating from the involute form; however, the mutual rolling movement with respect to each other should preferably be identical of a flat and involute surface. When they have the shape of a circle cylinder, vibrations can occur but still the pins can freely adjust their position.

The shown embodiment of the links has two holes but it is clear that these can be combined into a single one, although in that case the link will be somewhat weaker, because its central part will then be missing.

The interpieces which co-operate with the pins can be replaced by correspondingly shaped protrusions formed on the links themselves and extending into the link holes, although in that case greater loads will be exerted on the pins, the links must be manufactured very carefully and the chain can transmit less power.

What is claimed is:

1. Transmission chain for a cone pulley transmission comprising a number of links mutually coupled by elongate pins which extend through the links and each of which has first axial end faces engaging facing surfaces of a cone pulley, a plurality of elongate strip-shaped interpieces also extending through the links, said interpieces being shorter than said pins and having second axial end faces spaced from the facing surfaces of a cone pulley, said pins and interpieces having co-operating side surfaces engaging in a rolling motion with respect to each other, each link accommodates non-rotatably with respect thereto a said pin and in the longitudinal dimension of the link at a distance from said pin an interpiece, each pin having an active side surface directed to an active side surface of an opposite interpiece, there is in each link adjacent each active side surface of a pin and an interpiece respectively sufficient free space to accommodate an interpiece or pin respectively which is coupled to an adjacent link during the movement thereof, there being adjacent sets of links coupled mutually in the longitudinal direction of the transmission chain such that one pin in a first link co-operates with a rolling contact movement with an interpiece in an adjacent, staggered link.

2. Transmission chain according to claim 1, in which the free space adjacent each pin and interpiece respectively has upper and lower boundaries which correspond with the edges of the path as defined by the co-operating interpiece and pin respectively moving in the longitudinal direction of the chain.

3. Transmission chain according to claim 1, in which the active side surfaces of a pin is curved, and same of an interpiece is flat.

4. Transmission chain according to claim 1, in which the active side surface of a pin defines essentially an involute having a base circle near the inner edge of said active surface.

5. Transmission chain according to claim 1, in which the pins and interpieces are with a pressfit coupled to the respective links.

6. Transmission chain according to claim 1, in which the pins and interpieces are provided at their respective ends with a projection for locking them in longitudinal direction.

* * * * *